US010091380B1

(12) United States Patent
Robertson et al.

(10) Patent No.: US 10,091,380 B1
(45) Date of Patent: Oct. 2, 2018

(54) SYSTEMS AND METHODS OF IMPLEMENTING UNIVERSAL PRINT DRIVERS IN A WINDOWS PRINT ARCHITECTURE

(71) Applicant: Xerox Corporation, Norwalk, CT (US)

(72) Inventors: Alan Kenneth Robertson, Rochester, NY (US); Jonathan Edmonds, Silverton, OR (US); Jiawei Fann, Redmond, WA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/612,318

(22) Filed: Jun. 2, 2017

(51) Int. Cl.
*G06F 3/12* (2006.01)
*H04N 1/00* (2006.01)

(52) U.S. Cl.
CPC ....... *H04N 1/00938* (2013.01); *G06F 3/1203* (2013.01); *G06F 3/1225* (2013.01); *G06F 3/1236* (2013.01); *G06F 3/1254* (2013.01); *G06F 3/1286* (2013.01)

(58) Field of Classification Search
CPC . H04N 1/00938; G06F 3/1203; G06F 3/1225; G06F 3/123; G06F 3/1236; G06F 3/1254; G06F 3/1286
See application file for complete search history.

(56) References Cited

U.S. PATENT DOCUMENTS

| | | | |
|---|---|---|---|
| 6,184,998 B1* | 2/2001 | Tebeka | G06F 9/44505 358/1.13 |
| 2004/0109669 A1* | 6/2004 | Oka | H04N 1/00127 347/5 |
| 2012/0069366 A1* | 3/2012 | Heffner | G06F 3/1204 358/1.13 |
| 2012/0158890 A1* | 6/2012 | Jreij | G06F 11/0784 709/217 |
| 2014/0207973 A1* | 7/2014 | Robertson | G06F 9/4411 710/8 |
| 2017/0017444 A1* | 1/2017 | Hirano | H04N 1/00938 |
| 2017/0024170 A1* | 1/2017 | Li | G06F 3/1228 |

\* cited by examiner

*Primary Examiner* — Moustapha Diaby
(74) *Attorney, Agent, or Firm* — Fay Sharpe LLP (57) ABSTRACT

A method of implementing a universal print driver in the Windows® V4 print architecture is provided. The method includes monitoring an event log to detect one or more trigger events relating to a printer instance of a connected printing device; upon detection of a trigger event, scheduled poll interval expiration, and/or an on-demand request, comparing a print driver currently associated with the printer instance to an actual model of the connected printing device and determining whether the print driver needs to be switched from an old printing device model to the connected printing device model. If the print driver needs to be switched, then mapping data is used to automatically look up a name of a printing device model entry corresponding to the connected printing device model in an INF file, among other things.

20 Claims, 6 Drawing Sheets

SYSTEMS AND METHODS OF IMPLEMENTING UNIVERSAL PRINT DRIVERS IN A WINDOWS PRINT ARCHITECTURE

BACKGROUND

The exemplary embodiment relates to systems and methods for implementing a universal print driver in a Microsoft® Windows® V4 print architecture.

In the field of print driver architectures and platforms, printer manufacturers have long integrated print driver and related software for their particular output devices with commonly available computer operating systems, including the Microsoft® Windows® family of operating systems. In this regard, the Windows® third generation (V3) print architecture includes a software development kit (SDK) for print vendors, which enables them to write software plug-ins to handle many very flexible, low-level callback functions to fully customize the installation, graphical user interface (GUI) and rendering behaviors of a print driver.

A current global print driver (or universal printer driver) for the Microsoft® Windows® third generation (V3) print architecture supports printers and multi-function devices (MFDs). The V3 version of the global print driver (GPD) queries the connected printer across the network to determine its model, capabilities, and constraints. The GPD then uses the callbacks described above to fully virtualize the capabilities of a printer, such as its features and their supported options. The result looks and acts exactly like a traditional model-specific driver for that printer, but is easier for system administrators to manage.

However, starting with the Windows® 8 operating system, Microsoft introduced a new fourth generation (V4) print architecture. Significantly, the callback mechanism to allow a print driver to query device configuration data was eliminated. The only remaining mechanism requires the printing device to support specific protocols. Print drivers declare query strings in data files for use by the operating system but cannot execute the queries themselves. Data files are also used to map query results to installable option states to configure the print driver automatically.

However, many printers (or printing devices) do not support the specific protocols or queries necessary to enable automatic configuration in V4 print drivers for Windows® 8 and future versions of the operating system, and a separate driver is generally required for each model. System administrators would need to manually configure the V4 print driver for every printing device that does not support the specific required protocols and queries, even if a V3 print driver for the same printing device could successfully configure itself.

In addition, it is desirable to provide methods and systems for a universal print driver to not only auto-configure the installable device options, but also to tailor the behavior of the print driver's graphical user interface and its output as extensively as is appropriate for a specific printer model, in a V4 print driver.

Moreover, there is a need for a completely new approach, because the Windows® V4 print architecture eliminated the essential software call-back functions that vendors could use to return dynamically generated printer capabilities specifications and to perform other model-specific tasks. Windows® instead requires V4 drivers to define the capabilities, constraints, etc. of the printer in static data files that must be digitally signed and installed as part of the driver installation package. That requirement makes printer model capabilities virtualization impossible, since the vendor supplied files are processed by Microsoft® code, not vendor code, and are static.

INCORPORATION BY REFERENCE

The following reference, the disclosures of which are incorporated herein by reference, is mentioned:

U.S. Pub. No. 2014/0207973, published Jul. 24, 2014, entitled SYSTEMS AND METHODS FOR AUTO-CONFIGURING INSTALLABLE DEVICE OPTIONS IN A WINDOWS PRINT QUEUE, by Robertson, et al.

BRIEF DESCRIPTION

The exemplary embodiment describes a completely new design for a Windows® V4 universal print driver solution. The exemplary embodiment offers a novel design for users to download, install, manage, and periodically upgrade just one print driver package regardless of which or how many of a vendor's different printer models they have. The exemplary embodiment, among other things, automatically and dynamically directs the Windows® print spooler to use a set of data files based on the printer model currently attached to each printer instance, within the strict constraints imposed by the Windows® V4 print architecture.

In accordance with one aspect of the exemplary embodiment, a method of implementing a universal print driver in the Windows® V4 print architecture is provided. The method includes monitoring an event log to detect one or more trigger events relating to a printer instance of a connected printing device; upon detection of a trigger event, scheduled poll interval expiration, and/or an on-demand request, comparing a print driver currently associated with the printer instance to an actual model of the connected printing device and determining whether the print driver needs to be switched from an old printing device model to the connected printing device model; if the print driver needs to be switched, then using mapping data to automatically look up a name of a printing device model entry corresponding to the connected printing device model in an INF file; invoking a first print spooler application program interface (API) to add a reference to the connected printing device model in a Windows® registry if not already referenced, wherein the connected printing device model appears in a print spooler with an identification of the connected printing device model; invoking a second print spooler API to associate a new print driver for the connected printing device model to the printer instance that is being auto-configured and switch the printer instance to the new print driver; invoking one or more operating system APIs to reset any system-default settings from the old printing device model that are incompatible with the connected printing device model to compatible settings; and/or invoking one or more operating system APIs to reset any user-default settings from the old printing device model that are incompatible with the connected printing device model to compatible settings.

In accordance with another aspect of the exemplary embodiment, a system is provided. The system includes an interface to an output device; and a processor, communicating with the output device via the interface, the processor being configured to: monitor an event log to detect one or more trigger events relating to a printer instance of a connected printing device; upon detection of a trigger event, scheduled poll interval expiration, and/or an on-demand request, compare a print driver currently associated with the printer instance to an actual model of the connected printing device and determine whether the print driver needs to be switched from an old printing device model to the connected printing device model; if the print driver needs to be switched, then use mapping data to automatically look up a name of a printing device model entry corresponding to the connected printing device model in an INF file; invoke a first print spooler application program interface (API) to add a reference to the connected printing device model in a Windows® registry if not already referenced, wherein the connected printing device model appears in a print spooler with an identification of the connected printing device model; invoke a second print spooler API to associate a new print driver for the connected printing device model to the printer instance that is being auto-configured and switch the printer instance to the new print driver; invoke one or more operating system APIs to reset any system-default settings from the old printing device model that are incompatible with the connected printing device model to compatible settings; and/or invoke one or more operating system APIs to reset any user-default settings from the old printing device model that are incompatible with the connected printing device model to compatible settings.

In accordance with yet another aspect of the exemplary embodiment, a non-transitory computer-usable data carrier storing instructions that, when executed by a computer, cause the computer to perform a method of managing a universal print driver in the Windows® V4 print architecture is provided. The method includes monitoring an event log to detect one or more trigger events relating to a printer instance of a connected printing device; upon detection of a trigger event, scheduled poll interval expiration, and/or an on-demand request, comparing a print driver currently associated with the printer instance to an actual model of the connected printing device and determining whether the print driver needs to be switched from an old printing device model to the connected printing device model; if the print driver needs to be switched, then using mapping data to automatically look up a name of a printing device model entry corresponding to the connected printing device model in an INF file; invoking a first print spooler application program interface (API) to add a reference to the connected printing device model in a Windows® registry if not already referenced, wherein the connected printing device model appears in a print spooler with an identification of the connected printing device model; invoking a second print spooler API to associate a new print driver for the connected printing device model to the printer instance that is being auto-configured and switch the printer instance to the new print driver; invoking one or more operating system APIs to reset any system-default settings from the old printing device model that are incompatible with the connected printing device model to compatible settings; and/or invoking one or more operating system APIs to reset any user-default settings from the old printing device model that are incompatible with the connected printing device model to compatible settings.

Optionally, and in accordance with any or all of the aspects of the embodiment described herein, the comparing a print driver currently associated with the printer instance to an actual model of the connected printing device and determining whether the print driver needs to be switched from an old printing device model to the connected printing device model is initiated when a registered event occurs.

Optionally, and in accordance with any or all of the aspects of the embodiment described herein, the one or more trigger events are: a printer instance is installed, upgraded, or changed; a printer properties graphical user interface (GUI) utility is opened; a port or IP address to which a printer instance is connected is changed; an on-demand request; and/or a routine polling schedule.

Optionally, and in accordance with any or all of the aspects of the embodiment described herein, a driver installation package for the universal print driver includes executable software common to multiple printing device models and hidden entries defined in an INF file and associating model-specific data files which may define capabilities and constraints, among other things, for every supported printing device model. The driver installation package may comprise one or more fallback modes that work with other printing devices that support the driver's page-description language.

Optionally, and in accordance with any or all of the aspects of the embodiment described herein, when there is not a specific driver for the connected printing device model, detecting what printing device family the connected printing device is from and selecting a fallback driver for that family that can use one or more of a set of special features offered by that family.

Optionally, and in accordance with any or all of the aspects of the embodiment described herein, the event log comprises a Windows® event log enabled as the "Microsoft-Windows-PrintService/Operational" event log

DETAILED DESCRIPTION

Embodiments of the present teachings relate to systems and methods for implementing a universal print driver in a Microsoft® Windows® V4 print architecture, since the prior methods used in the Microsoft® Windows® V3 print architecture cannot be used. More particularly, embodiments relate to platforms and techniques for establishing and executing printer instance and related output operations under the Windows® 8 and later-developed operating systems, in which operating system resources are invoked to allow the monitoring and polling of printer instance and other events via the operating system, itself. Once a printer-related event is detected, a print configuration module and associated processes and logic can be invoked to execute code to query the printing device and obtain configuration data via any useful protocol, without a need for the output device itself to be configured to support standards and protocols specific to Windows® 8 and later operating systems.

Reference will now be made in detail to exemplary embodiments of the present teachings, which are illustrated in the accompanying drawings. Where possible the same reference numbers will be used throughout the drawings to refer to the same or like parts.

Figure 1:
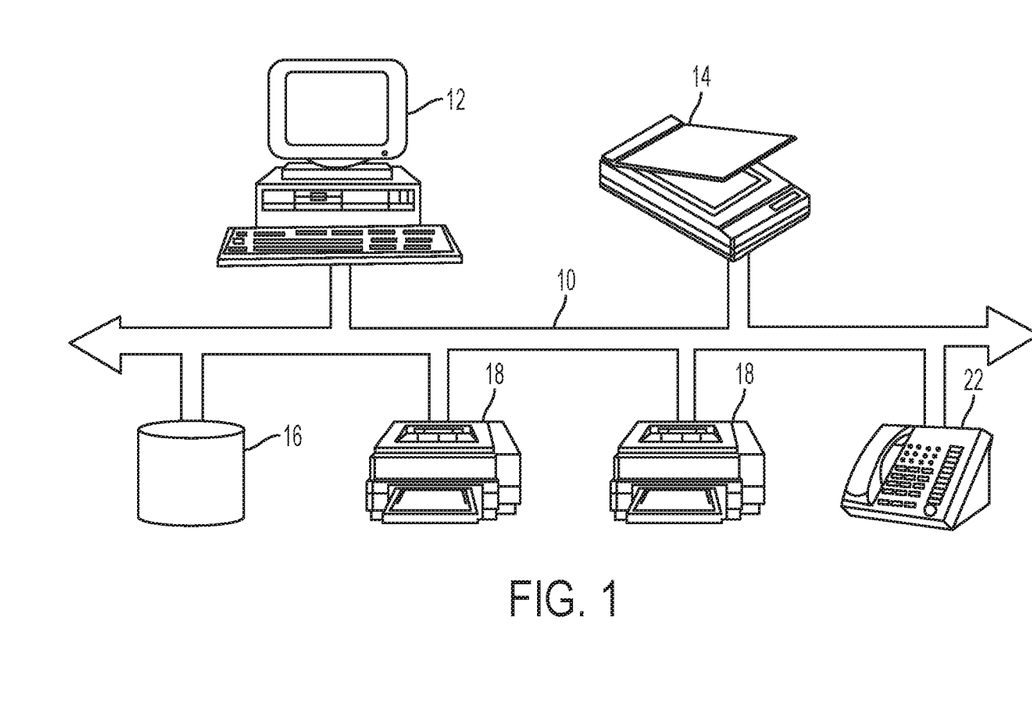
FIG. 1 is a functional block diagram of an overall network environment in which systems and methods for implementing a universal print driver in a Microsoft® Windows® V4 print architecture can be applied in accordance with aspects of the exemplary embodiment.

FIG. 1 illustrates an overall environment in which systems and methods for implementing a universal print driver in a Microsoft® Windows® V4 print architecture can operate in accordance with aspects of the exemplary embodiment. A network bus 10, which may be of any type known in the art, such as Ethernet or Token-Ring, interconnects any number of computers and peripherals. For example, on network 10 there would be typically any number of personal computers such as 12, scanners such as 14, shared memories such as 16, and of course printers such as 18 and 20. The network 10 may further interconnect a fax machine 22, which in turn connects with a standard telephone network. What is important is that the various computers and peripherals can interact to perform various document services, including generating reliable printer instances.

As used herein, the term "printer instance" refers generally to an instance of a given printing device and its driver as exposed to users in Windows®, e.g., the devices Microsoft® calls "Printers" when the "Devices and Printers" folder from the Control Panel is opened, or as presented in an administrative tool, such as the Print Management Console. Further, a "printer instance" may also maintain a list of printer output jobs held in a reserved memory area, i.e., what is commonly known as a "print queue," which includes the most current status of all active and pending print jobs. A print queue typically gives users printer management capabilities to facilitate control of print queue operations like pausing, resuming or canceling jobs. Some print queues allow users to prioritize print jobs and change the order of a queue. A print queue generally displays information such as: the file name of the print job, the status of the print job, the user, which is helpful in a shared network printing environment, the total number of printed pages, the printed document size, the date and timestamp of a pending or printed document, and/or the printer port.

Figure 2:
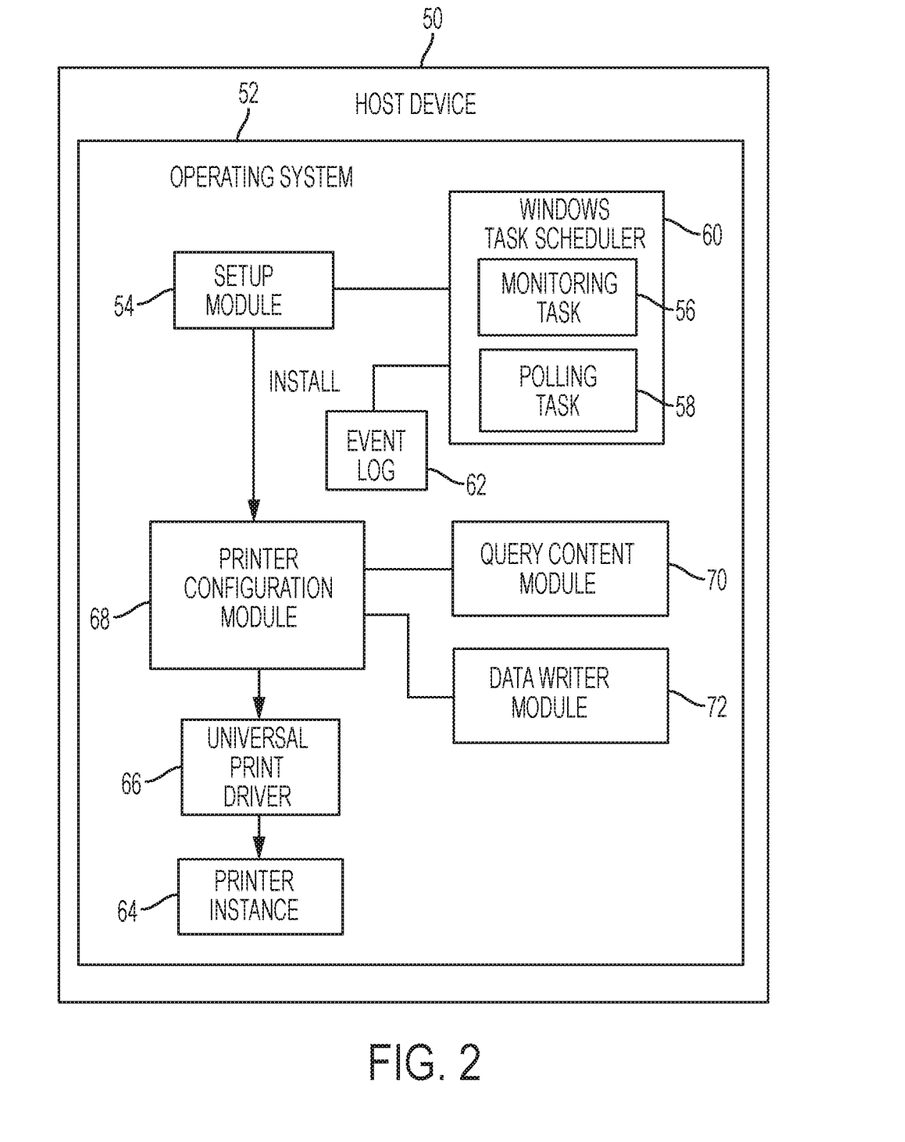
FIG. 2 is an architecture for applying systems and methods for implementing a universal print driver in a Microsoft® Windows® V4 print architecture in accordance with aspects of the exemplary embodiment.

More specifically, and as for instance illustrated in FIG. 2, a host device 50 can be configured to host hardware, software, modules, logic, services, and/or other resources to support and manage output operations to a printing device, such as a printer, a multi-function device (MFD), or other device (for example, one of the devices 18 and 20 as shown in FIG. 1), running under an operating system 52 configured to operate on a query model to discover installable print options. As used herein, the term "multi-function device" refers to a rendering device or office machine which incorporates the functionality of multiple devices in a single apparatus or system to leave a smaller footprint in a home or a small business setting, or to provide centralized document management/distribution/production in the context of, for example, a large-office setting. A typical MFD may provide a combination of various capabilities, including a printer, a scanner, a photocopier, a fax machine, e-mail capability, and so forth. Networked MFDs generally interact with a group of varying rendering devices, client computers, servers, and other components that are connected to and communicate over a network.

According to various aspects of the exemplary embodiment, the operating system 52 can be, or include, the Windows® 8 or later operating systems. In implementations as shown, any number of resources can operate in the host device 50 in conjunction with or under control of the operating system 52. The host device 50, for instance, can be, or include, a desktop or laptop computer, as well as a print-enabled mobile device, such as a smartphone or tablet. In implementations, the host device 50 can be, or include, a print server, for instance, a print server installed on a local area network (LAN) or other network. In implementations, the host device 50 can be, or include, a printer or other output device, itself. In still further implementations, the host device 50 can be implemented as a logical entity instantiated in a cloud-based network, and/or other hardware, software, and/or other networks or entities.

In aspects of the exemplary embodiment, a setup module 54 can be executed through the operating system 52 to install a set of software, resources, and settings related to printing and other output operations. The setup module 54 can install tasks or processes including an event monitoring task 56 and a polling task 58, which can operate in conjunction with a task scheduler 60. The task scheduler 60 can be a part of the operating system 52 and operate to monitor various events, threads, applications, and/or processes executing under the operating system 52 on the host device 50. Either or both of the monitoring task 56 and the polling task 58 can be instantiated as process having an administrative level of privilege. The setup module 54 can also instruct, or cause, the operating system 52 to begin logging output-related events to an event log 62, including the establishment or updating of at least one printer instance 64, the installation or updating of a printer, an MFD, or other output device, and/or other events. The event log may comprise, for example, a Windows® event log enabled as the "Microsoft-Windows-PrintService/Operational" event log. The operating system 52 can install and manage a universal print driver 66, which is used to direct print jobs and other output to the printer instance 64.

The monitoring task 56 can be configured to monitor the event log 62 to detect the occurrence of a print-related task, and/or other output activity. When a print-related task, such as the addition of a print job to the printer instance 64, or other event occurs, the monitoring task 56 can detect that event in the event log 62 and perform a set of additional tasks to automatically configure the installable options for the printer instance 64 based on the actual current configuration of the printer or other output device. Additionally, the universal print driver 66 will automatically check the model and switch models if appropriate as explained below, for example. In aspects, the polling task 58 can operate to perform query operations by interrogating connected printers or other devices, or by using a predetermined time interval, rather than on an event-triggered basis, like the monitoring task 56. The polling task 58 can be configured to query connected printers or other devices every 4 hours, every 6 hours, every 8 hours, every day, and/or other periods of time, so that printers and other devices which are attached, detached, and/or updated can have their configuration data regularly refreshed so that users can utilize those devices conveniently, without having to manually update the configuration options.

Once a printer instance-related event is detected via the event log 62, for example, the monitoring task 56 can launch a printer configuration module 68. The printer configuration module 68 manages relatively short-lived or transient child processes to automatically configure the universal print driver 66. It is further noted that the same components may also configure other V4 drivers if any are installed on the host along with the universal print driver 66. Each of the processes launched by, or under, the printer configuration module 68 can run with the lowest possible privileges under the operating system 52 to minimize security risks. When the host device 50 comprises a print server, for example, the host device 50 can provide bidirectional (BiDi) data exchange capabilities for all connected clients.

In general, the use of BiDi data communications allows the printer configuration module 68 to manage and support any number of print-related data and resources, including installable options and/or auto-configuration data set directly in Windows® 8 format so that the core drivers contained in Windows® 8 and/or later operating systems will correctly recognize installable output options, transparently. The printer configuration module 68 can invoke or instantiate further tasks, logic, or processes to manage print or other output events, on an event-driven basis, for instance executing code using any useful protocol to query a printing device for configuration information. The further tasks or processes invoked by the printer configuration module 68, as illustrated, can be or include a query content module 70 and a data writer module 72. The data writer module 72 can be configured to store the processed results of queries in the manner established in the Windows® 8 and later family of operating systems so that the print driver will respond as if it has been configured directly by the native method supported by the operating system. The printer configuration module 68 can manage the polling interval and periodically launch the query content module 70 and data writer module 72 as transient child processes, as noted, as well as periodically check for changes such as changes in port assignments, the IP address or host name of output devices, or others. It is further noted that the same components may also perform the automatic model switching for the universal print driver 66. In the exemplary embodiment, it is the data writer module 72 that performs the task of switching printer models. Those options can include features or options such as stapling, punching, or folding, with details regarding the number, type, location, etc. of each of those paper handling options.

Once launched, the query content module 70 can access any connected network to which the host device 50 is connected, running as a network service. In aspects, the query content module 70 does not require administrator privileges, or even user-level privileges. The query content module 70 can access and interact with dynamic link libraries (DLLs) and other resources designed to query printing device configuration under pre-Windows 8 operating systems in the Windows® family of operating systems, without necessary modifications to those resources. Those DLLs and other resources can be used to extract and read printer configuration data and/or auto-configuration data for other types of output devices and report that configuration data to the operating system 52 using standard or proprietary BiDi query structures supported by the printing device. Those and related operations performed by the query content module 70 can include, for example, parsing of data files to obtain the attribute and value names for all installable options supported by the printing device. The query content module 70 can query the requested BiDi data for the printer instance 64 or other queues specified when the printer configuration module 68 launches the query content module 70. The query content module 70 can likewise convert any legacy data formats into a standard format, such as XML (extensible markup language)-based formats, or others. Query results developed by the query content module 70 can be written to XML or other files on disk or other memory or media. Once the configuration data needed to populate the printer instance 64 is acquired, the query content module 70 can exit or terminate promptly as a process under the operating system 52, to avoid processor overhead and enhance security of the operating system 52. In implementations, the universal print driver module 66 can be configured to apply installable option constraints or rules which prevent an A3-sized print job from being loaded into printer instance 64 for a printer which is not capable of handling that size stock, for example. It is further noted that the process of switching printer models preferably includes tailoring the whole user interface for that printer model, including the pictures of the printer showing the actual printer model and its configuration. And the output of the driver is preferably tailored for the needs of that device too. It is to be understood that other rules, parameters, constraints, or logic can be used.

In addition to the query content module 70, the printer configuration module 68 can invoke the data writer module 72 to perform data output or writing tasks associated with the printer instance 64. According to aspects, the data writer module 72 can execute with administrative privileges, and write to a registry key in operating system 52, such as the "PrinterDriverData" registry key in Windows® 8, and/or to the Queue Property Bag associated with the printer instance 64 in Windows® 8 or later. In connection with writing operations, the data writer module 72 can parse the auto-configuration data from the XML or other files created by the query content module 70 while performing query operations. The data writer module 72 can use that data to configure the printer instance 64 using that data, for instance by writing corresponding attribute values to the registry of Windows® 8 or other operating system. Additionally, the data writer module 72 may make additional queries to the device as required to facilitate the model switching function of the universal print driver 66.

After performing those or other writing or output operations, the data writer module 72 can likewise exit or terminate promptly, both to minimize processor load and reduce security risks. The printer configuration module 68, the query content module 70, and the data writer module 72 thus cooperate to configure the print driver by writing data to the same locations and in the same format as the native BiDi query architecture of Windows® 8 would do so that the source of these data is transparent to the print driver.

It is noted that as used herein, a "module" can refer to one or more applications, utilities, threads, processes, services, and/or other logic, or processors or other hardware configured to execute that logic, and/or other resources. A "module" can likewise in cases be discrete, or combined with other modules or resources.

A print driver normally lists one or more related sub-models for one product. Typically, print drivers expose this list to Windows® through a text file with the file extension ".INF." As used herein, "INF" refers to a file extension for a plain text file used by Microsoft® Windows® for the installation of software and drivers. It is also referred to as a Setup Information file. The INF file contains various sections that specify the files to be copied, changes to the registry, etc. All INF files generally contain a [Version] section with a Signature value specifying the version of Windows® that the INF file is destined for. Most of the remaining sections are user-defined and contain information specific to the component being installed.

Figure 3:
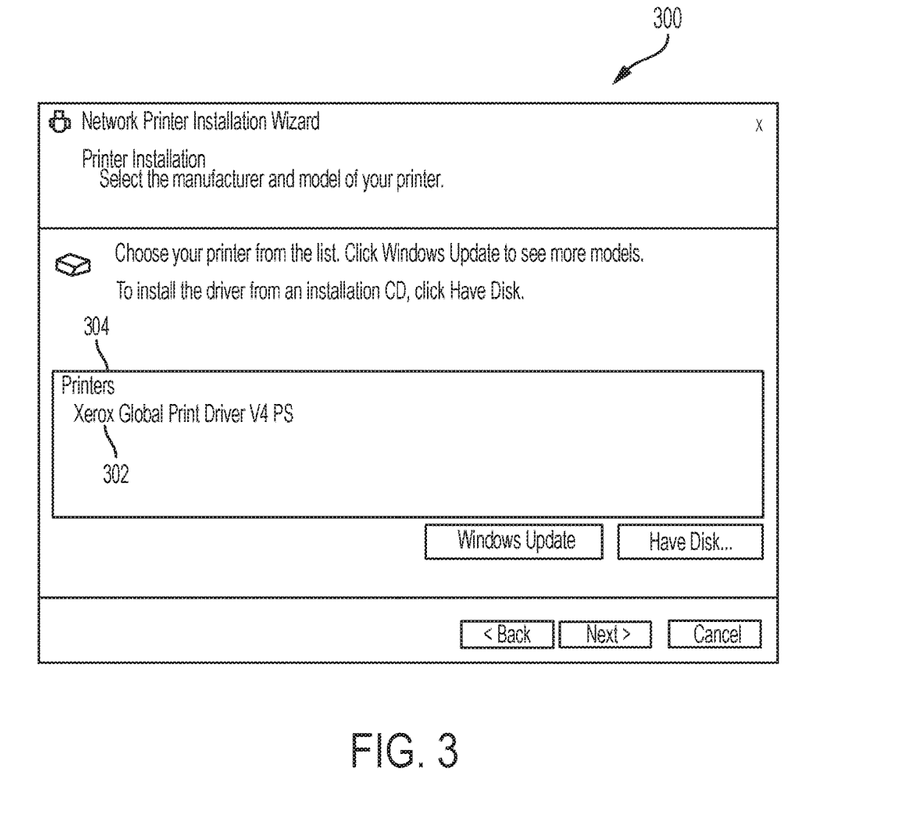
FIG. 3 is a screenshot of a network printer installation in accordance with aspects of the exemplary embodiment

Preferably, the universal print driver 66 is configured to display a single print driver model name for ease of reference, as shown, for example, in FIG. 3, which shows a sample screenshot of a Windows® Network Printer Installation Wizard 300. In that case, the single print driver model name preferably has a special product-independent name 302, for example, "Xerox Global Print Driver V4," under the list of printers. Since there may be universal print drivers for more than one page-description language, a suffix may be added to denote that aspect, for example, "Xerox Global Print Driver V4 PS." In this example, the suffix "PS" denotes the PostScript version of the driver. Of course, it is to be understood that variations on these naming concepts are possible. For example, two or more names could be listed instead of just one name in alternative embodiments.

However, all supported printing device models still need to be defined in the INF file for them to work. This is achieved, for instance, by using an INF file option to hide names that users do not need to see in the list when installing the universal print driver 66.

For proper functioning, the actual data files representing the capabilities, constraints, etc. of each supported printing device model are included in the install package of the universal print driver 66.

Another major difference in the V4 print architecture is that Windows® does not invoke any vendor-provided code during the installation of a print driver or when changing printer properties, so there is no opportunity to perform value-added tasks. In contrast, V3 drivers receive highly customizable callbacks at that time which Windows® invokes with full Administrator rights. This is why components installed separately from the printer's INF file are typically required to enable these capabilities in the V4 driver.

Figure 4:
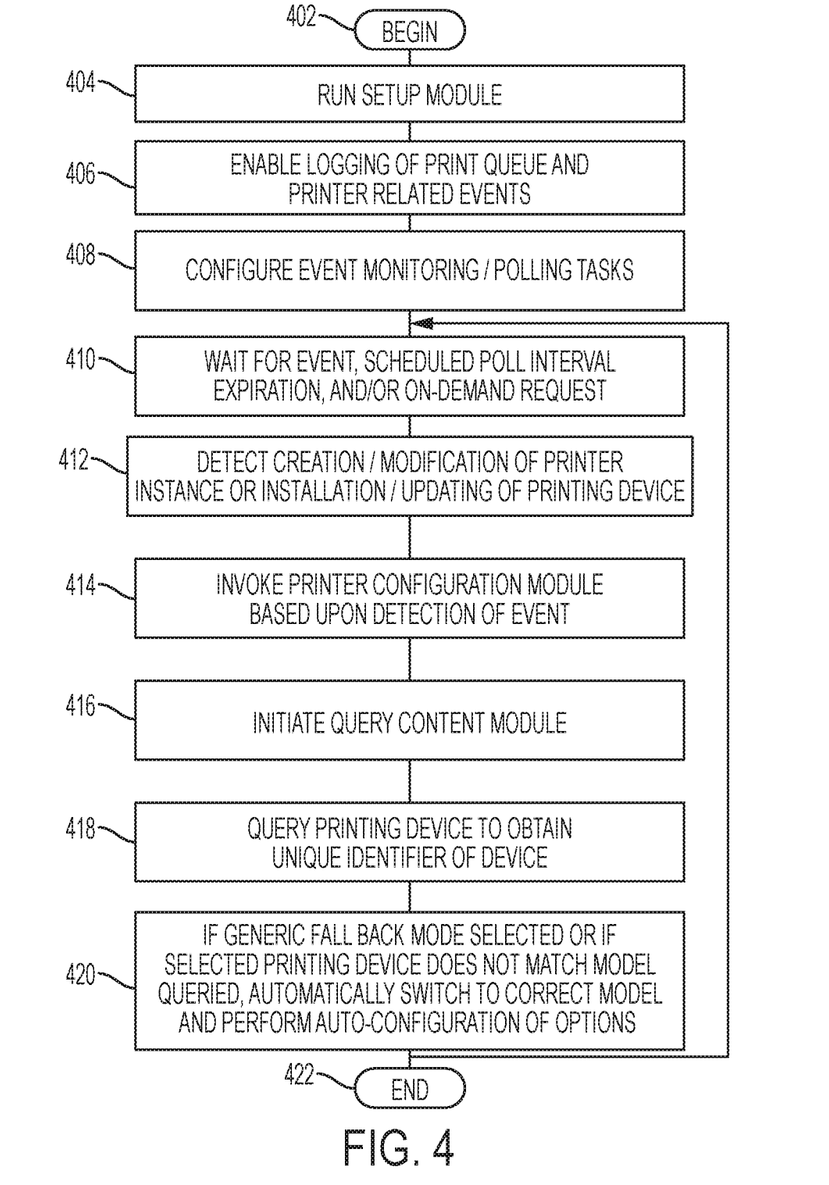
FIG. 4 is a flowchart illustrating a method of implementing a universal print driver in a Microsoft® Windows® V4 print architecture in accordance with aspects of the exemplary embodiment.

FIG. 4 illustrates a flowchart of implementing and processing a universal print driver in a Windows® V4 print architecture in accordance with aspects of the exemplary embodiment. In 402, processing can begin.

In 404, the setup module 54 can be run, for instance by a systems administrator who pushes the setup module to laptops, desktops, smartphones, and/or other devices on a local or wide area network. In 406, logging of print-queue and printer-related events can be enabled by the setup module 54 to, for instance, record or log those events to an event log 62 maintained by the operating system 52, such as the Windows® 8 or later operating systems. In 408, the monitoring task 56 and/or the polling task 58 can be created under the task scheduler 60 by the setup module 54, to perform event monitoring and/or polling operations as described herein. In 410, the system waits for an event, scheduled poll interval expiration, and/or on-demand request.

In 412, the monitoring task 56 can detect the creation, modification, and/or other status of the printer instance, as well as the installation or updating of a printing device, such as a printer, an MFD, or other output device, connected to, or installed or operating on, the host device 50. In aspects, activity related to the printer instance 64 and/or the printing device can be detected, for instance, by detecting the entry of events in the event log 62 of the operating system 52. In 414, the printer configuration module 68 can be invoked via the monitoring task 56 and/or other logic based upon the detection of a creation or modification event related to the printer instance 64 and/or to the installation or updating event related to the printing device. In 416, the query content module 70 can be initiated via the printer configuration module 68, to execute as relatively short-term or ad hoc tasks.

In 418, the universal print driver 66 queries the printing device to obtain a unique identifier representing a specific printing device model, such as the sysObjectID. Preferably, the query content module 70 and the data writer module 72 cooperate to accomplish this task. In 420, if a generic fallback mode is currently selected, or if the currently selected printing device model does not match the model that was queried, the universal print driver 66 will automatically switch to the correct printing device model and then perform auto-configuration of its installable options, such as finishers and others, via an auto-configuration system such as the one described in U.S. Pub. No. 2014/0207973, published Jul. 24, 2014, entitled SYSTEMS AND METHODS FOR AUTO-CONFIGURING INSTALLABLE DEVICE OPTIONS IN A WINDOWS PRINT QUEUE, by Robertson, et al., the disclosures of which are incorporated by reference herein. This procedure is done silently, in the background, with no user intervention required. If a generic fallback mode is currently selected, or if the currently selected printing device model does not match the model that was queried, then the system tries to match the detected model to a model supported by the universal print driver, and automatically switch to that model.

It is noted that the cycle may continue as appropriate. Thus, after 420, the process preferably loops back to 410, i.e., a state of waiting for a change event or expiration of the polling interval timer. Basically, after initiating the event monitoring and/or polling tasks in 408, the device code is dormant until the Windows® Task Scheduler wakes it up to process a change event or route poll. And once the steps through 420 are completed, the process returns to that dormant/waiting state. Further, each time one of the user interfaces is opened, the universal print driver 66 may also quickly query the device and, if necessary, automatically switch models and perform auto-configuration of installable options, so the user interface can always display the correct model as long as the device is up and able to perform a query on the network. The processing (i.e., 410-420) is essentially the same, but what is different is that this processing is initiated as a result of the user opening one of the driver's user interfaces. Processing ends at 422.

Figure 5:
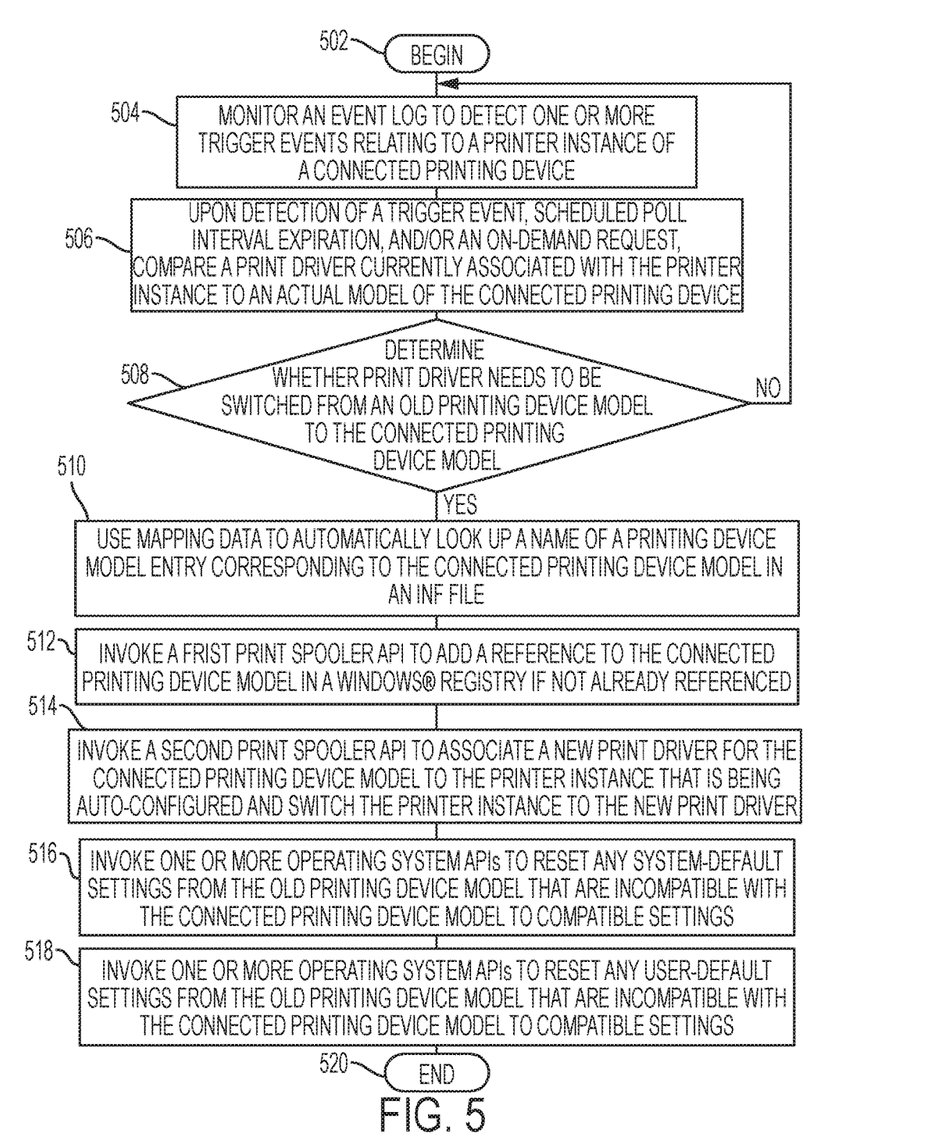
FIG. 5 is a flowchart illustrating a method of implementing a universal print driver in a Microsoft® Windows® V4 print architecture in accordance with aspects of the exemplary embodiment.

FIG. 5 illustrates a flowchart of the automatic switching and auto-configuration process regarding the universal print driver in accordance with aspects of the exemplary embodiment in greater detail. In 502, processing can begin. In 504, the system waits for an event, scheduled poll interval expiration, and/or on-demand request. That is, the event log is monitored to detect one or more trigger events relating to a printer instance of a connected printing device. That is, to provide a seamless operation, the printing device model is confirmed and automatic printing device model switching occurs, if appropriate, when one or more events is detected on the event log. For example, one possible trigger event is when a printer instance is installed, upgraded, or changed.

Another possible trigger event is when a system administrator opens the Windows® built-in printer properties dialog. Windows built-in printer properties dialog is typically used to perform tasks, such as changing the network address specifying the connected device and thereby pointing to a different printer. Many operations in that dialog result in events being logged with trigger an auto model selection code.

Another possible trigger event is when a system administrator changes the port or IP address to which a printer instance is connected.

Further still, the printing device model is confirmed and automatic printing device model switching occurs, if appropriate, as part of a routine polling schedule, which is configurable but may be, for example, every 6 hours by default.

Additionally, the printing device model is confirmed and automatic printing device model switching occurs, if appropriate, at other times where it is desirable to report the latest information about the connected printer, for example, when a user opens a print driver supplied GUI, even if a change has occurred which would not otherwise be detected until the next periodic poll or event occurs.

In 506, upon detection of a trigger event, scheduled poll interval expiration, and/or an on-demand request, the process involves comparing the driver currently associated with the printer instance to the actual model of the connected printer, and determining, in 508, whether the print driver needs to be switched from an old printing device model to the connected printing device model, and switching the driver if it does not match. Moreover, the processing in 506 can also be initiated when a registered event occurs and/or when it is time for the next periodic poll. Both of these may be implemented, for example, via the Windows® Task Scheduler tasks as described herein.

As described above, the driver installation package for the universal print driver 66 generally contains (1) executable software common to multiple printing device models and (2) hidden entries associating the model-specific data files which define the capabilities and constraints, among other things, for every supported model as well as, for example, simple generic sets used for one or more fallback modes, which work with most other printing devices that support the driver's page-description language.

It is noted that there may be cases where there is not a specific driver for a particular printer model, but the software can detect what family it is from and can select a fallback driver for that family that can make use of at least some of the special features offered by that family. That is an alternative to always picking a lowest-common-denominator fallback driver with very few features and options.

The universal print driver 66 also includes a new data file, which maps the unique printing device model identifier obtained by querying the device to the name of the hidden driver model entry in the INF file. In 510, when the auto-configuration system determines that a printing device model switch is required, as described above, that mapping data is used to automatically look up the name of the driver model entry in the INF file. Preferably, the data writer module 72 reads this file as part of doing the actual model switch.

Next, in 512, the auto-configuration system via the data writer module 72, for example, invokes a Windows® print spooler application program interface (API) to add a reference to that particular printing device model in the Windows® registry if it has not already been created for another queue. As used herein, API refers to a set of routines, protocols, and tools for building software applications. An API specifies how software components should interact.

It is noted that that the Windows® print spooler and accompanying documentation may refer to that reference as a "driver," but that is very different from the print driver package a system administrator downloads from the printer manufacturer, even though both are commonly referred to as "drivers." The key distinctions here are that (1) no new files are installed and (2) no files are copied when adding such a reference. All the files needed to support all models have already been installed, for example, on disc when the universal print driver 66 was first installed on the host device 50, thus creating a universal driver solution. One or more new registry entries for the particular printing device model are created via the data writer module 72. The data writer module 72 calls public operating system print spooler APIs to add the reference to the required driver. The print spooler APIs are typically configured to manage the registry entries. Preferably, the auto-configuration system just tells the print spooler APIs which hidden INF file entry to register. This is the result of calling the print spooler APIs to add a reference, for instance.

Figure 6:
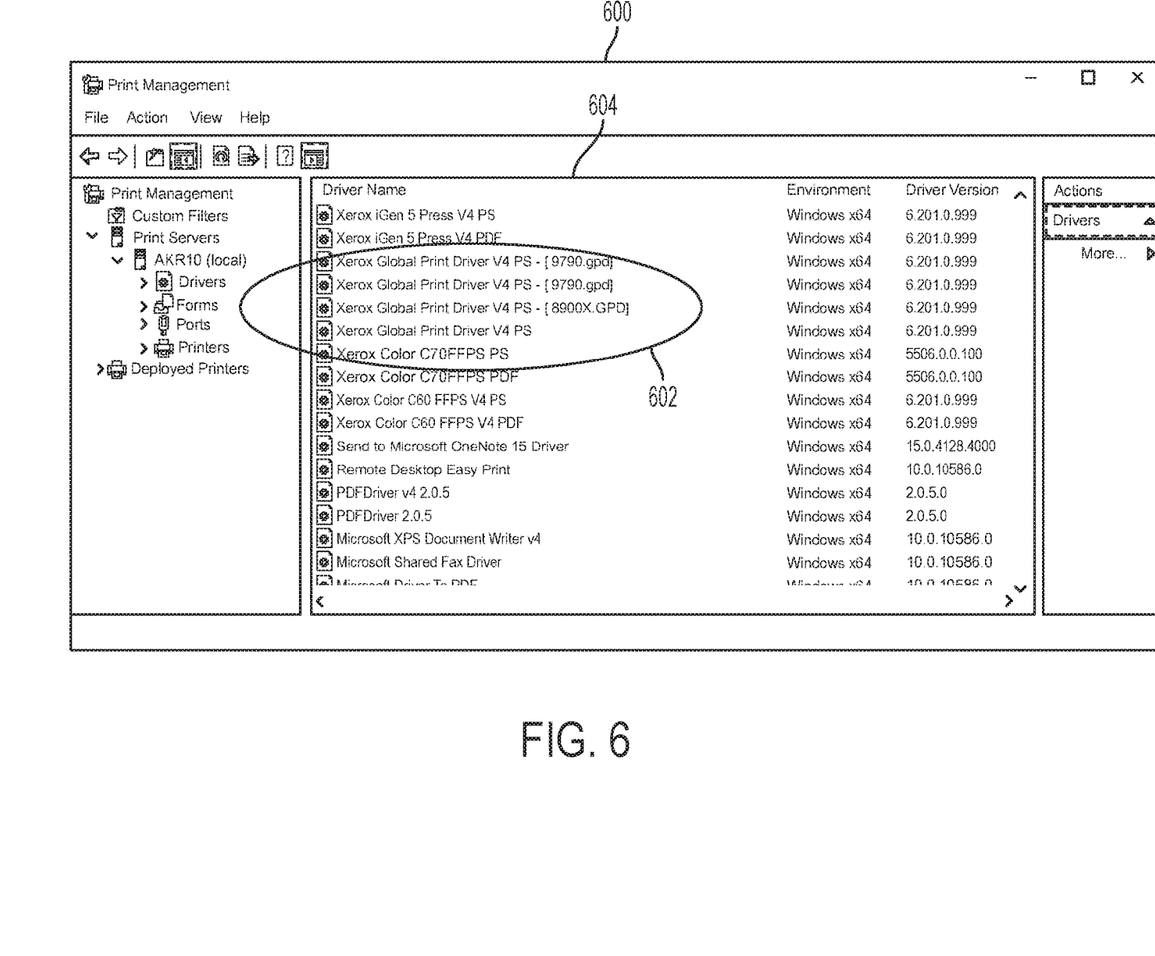
FIG. 6 is a screenshot of a print management system in accordance with aspects of the exemplary embodiment.

Preferably, a new "print driver" model appears in the print spooler with a suffix representing the specific printing device model, for example, "Xerox Global Print Driver V4 PS—[9301.gpd]", as shown, for example, in the Windows® Print Management View 600 in FIG. 6. That is, only printing device models that have been used (602) appear in the list 604. It is to be understood, however, that there may be other means of identifying the specific printing device model in the print spooler. All drivers are listed in an INF file on a disc. References to them are added when someone wants to use one. Thus, the ones in use or ready to be used are essentially registered with the print spooler. These show up in GUI administration tools, such as the Windows® Print Management Console and the like.

In 514, a second print spooler API is invoked to associate a new print driver for the connected printing device model to the printer instance that is being auto-configured and switch the printer instance to the new print driver.

In 516, the auto-configuration system via the data writer module 72 invokes one or more additional operating system APIs to clean up any incompatible system-default print settings from the old printing device model to ensure a smooth transition. And the auto-configuration system via the data writer module 72 sets the new "print driver" reference, e.g., "Xerox Global Print Driver V4 PS—[9301.gpd]" for a Xerox ColorQube 9301, as the driver for the printer instance in question.

Finally, in 518, the auto-configuration system via the data writer module 72 looks for saved user-default print settings for all users, both on the local PC and on any of the client PCs if, for example, Point-and-Print client/server printing is being used, and resets any user-default print settings that would not be compatible with the newly selected model to factory defaults. These clean up steps are very important for the reliable operation of the universal print driver 66. In 520, processing ends.

To summarize, in accordance with the exemplary embodiment, there is only one universal print driver to download, only one universal print driver to install, and only one copy of files on disc for all queries and printing device models. When the auto-configuration system detects that the printing device model does not match, it creates a new, specific instance of the existing driver (i.e., just entries in the registry) corresponding to one of the hidden entries in the INF, if needed. Then it automatically switches the printer instance to that instance so that printer instance will use the correct model-specific set of data files.

It will be appreciated that while various processing activity, logical decisions, and/or other operations illustrated in FIGS. 4 and 5 or elsewhere have been described as taking place in steps, that two or more of various of those operations or activities can be combined into one operation or activity, and that any one or more of those operations or activities can be divided into two or more operations or activities. Moreover, while those various operations or activities have been illustrated and described as occurring in a certain order, it will be appreciated that in implementations, those same and/or other operations or activities can take place in a different order or orders. It will likewise be understood that indicated reference numbers in connection with the various illustrated steps are intended for reference only, and are not meant to necessarily imply dependencies, precedence, and/or orders between steps, or that steps cannot be rearranged or reordered. Further, while various operations or activities have been described as being carried out by certain hardware, software, service, and/or other resources, it will be appreciated that in implementations, the same activities and/or operations can be carried out by other hardware, software, service, and/or other resources, and/or combinations of the same.

It will likewise be appreciated that the foregoing description is illustrative, and variations in configuration and implementation may occur to persons skilled in the art. For example, while embodiments have been described in which the output delivered to the printer instance consists of a printed page, in alternative implementations the output can take other forms, such as a facsimile transmission page, output from a copier or multi-function device, or other output. Similarly, while embodiments have been described in which a printer instance is built in a host device, such as a print server, in alternative implementations, the printer instance can be hosted in other devices or locations, such as a laptop or personal computer, a smartphone, tablet, or other mobile device, an application or service running in a local or remote network and/or in a cloud network, or others.

Further, while implementations have been described which incorporate a printer configuration module 68, query module 58, data writer module 72, and other modules, logic, and/or services as distinct units, in implementations, any one or more of those modules or related logic can be combined into one or more other modules, logic, and/or services. Likewise, while implementations have been described which incorporate a printer configuration module 68, query module 58, data writer module 72, and other modules, logic, and/or services as individual units, in implementations, those modules or related logic can be divided into two or more other internal or external modules, software logic, and/or services. Other resources described as singular or integrated can in embodiments be plural or distributed, and resources described as multiple or distributed can in embodiments be combined. The scope of the present teachings is accordingly intended to be limited only by the following claims.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of implementing a universal print driver in the Windows® V4 print architecture, the method comprising:
    monitoring an event log to detect one or more trigger events relating to a printer instance of a connected printing device;
    upon detection of a trigger event, scheduled poll interval expiration, and/or an on-demand request, comparing a print driver currently associated with the printer instance to an actual model of the connected printing device and determining whether the print driver needs to be switched from an old printing device model to the connected printing device model;
    if the print driver needs to be switched, then using mapping data to automatically look up a name of a printing device model entry corresponding to the connected printing device model in an INF file;
    invoking a first print spooler application program interface (API) to add a reference to the connected printing device model in a Windows® registry if not already referenced, wherein the connected printing device model appears in a print spooler with an identification of the connected printing device model;
    invoking a second print spooler API to associate a new print driver for the connected printing device model to the printer instance that is being auto-configured and switch the printer instance to the new print driver;
    invoking one or more operating system APIs to reset any system-default settings from the old printing device model that are incompatible with the connected printing device model to compatible settings;
    invoking one or more operating system APIs to reset any user-default settings from the old printing device model that are incompatible with the connected printing device model to compatible settings.

2. The method of claim 1, wherein the comparing a print driver currently associated with the printer instance to an actual model of the connected printing device and determining whether the print driver needs to be switched from an old printing device model to the connected printing device model is initiated when a registered event occurs.

3. The method of claim 1, wherein the one or more trigger events comprise: a printer instance is installed, upgraded, or changed; a printer properties graphical user interface (GUI) utility is opened; a port or IP address to which a printer instance is connected is changed; and/or a routine polling schedule.

4. The method of claim 1, wherein a driver installation package for the universal print driver includes executable software common to multiple printing device models and hidden entries defined in an INF file and associating model-specific data files which define capabilities and constraints for every supported printing device model.

5. The method of claim 4, wherein the driver installation package comprises one or more fallback modes that work with other printing devices that support the driver's page-description language.

6. The method of claim 1, wherein when there is not a specific driver for the connected printing device model, detecting what printing device family the connected printing device is from and selecting a fallback driver for that family that can use one or more of a set of special features offered by that family.

7. The method of claim 1, wherein the event log comprises a Windows® event log enabled as the "Microsoft-Windows-PrintService/Operational" event log.

8. A system, comprising:
    an interface to an output device; and
    a processor, communicating with the output device via the interface, the processor being configured to:
    monitor an event log to detect one or more trigger events relating to a printer instance of a connected printing device;
    upon detection of a trigger event, scheduled poll interval expiration, and/or an on-demand request, compare a print driver currently associated with the printer instance to an actual model of the connected printing device and determine whether the print driver needs to be switched from an old printing device model to the connected printing device model;
    if the print driver needs to be switched, then use mapping data to automatically look up a name of a printing device model entry corresponding to the connected printing device model in an INF file;

invoke a first print spooler application program interface (API) to add a reference to the connected printing device model in a Windows® registry if not already referenced, wherein the connected printing device model appears in a print spooler with an identification of the connected printing device model;

invoke a second print spooler API to associate a new print driver for the connected printing device model to the printer instance that is being auto-configured and switch the printer instance to the new print driver;

invoke one or more operating system APIs to reset any system-default settings from the old printing device model that are incompatible with the connected printing device model to compatible settings;

invoke one or more operating system APIs to reset any user-default settings from the old printing device model that are incompatible with the connected printing device model to compatible settings.

9. The system of claim 8, wherein the comparing a print driver currently associated with the printer instance to an actual model of the connected printing device and determining whether the print driver needs to be switched from an old printing device model to the connected printing device model is initiated when a registered event occurs and/or when it is time for a periodic poll.

10. The system of claim 9, wherein when there is not a specific driver for the connected printing device model, detecting what printing device family the connected printing device is from and selecting a fallback driver for that family that can use one or more of a set of special features offered by that family.

11. The system of claim 9, wherein the event log comprises a Windows® event log enabled as the "Microsoft-Windows-PrintService/Operational" event log.

12. The system of claim 8, wherein the one or more trigger events comprise: a printer instance is installed, upgraded, or changed; a printer properties graphical user interface (GUI) utility is opened; a port or IP address to which a printer instance is connected is changed; and/or a routine polling schedule.

13. The system of claim 8, wherein a driver installation package for the universal print driver includes executable software common to multiple printing device models and hidden entries associating model-specific data files which define capabilities and constraints for every supported printing device model.

14. The system of claim 13, wherein the driver installation package comprises and one or more fallback modes that work with other printing devices that support the driver's page-description language.

15. A non-transitory computer-usable data carrier storing instructions that, when executed by a computer, cause the computer to perform a method of managing a universal print driver in the Windows® V4 print architecture, the method comprising:

monitoring an event log to detect one or more trigger events relating to a printer instance of a connected printing device;

upon detection of a trigger event, scheduled poll interval expiration, and/or an on-demand request, comparing a print driver currently associated with the printer instance to an actual model of the connected printing device and determining whether the print driver needs to be switched from an old printing device model to the connected printing device model;

if the print driver needs to be switched, then using mapping data to automatically look up a name of a printing device model entry corresponding to the connected printing device model in an INF file;

invoking a first print spooler application program interface (API) to add a reference to the connected printing device model in a Windows® registry if not already referenced, wherein the connected printing device model appears in a print spooler with an identification of the connected printing device model;

invoking a second print spooler API to associate a new print driver for the connected printing device model to the printer instance that is being auto-configured and switch the printer instance to the new print driver;

invoking one or more operating system APIs to reset any system-default settings from the old printing device model that are incompatible with the connected printing device model to compatible settings;

invoking one or more operating system APIs to reset any user-default settings from the old printing device model that are incompatible with the connected printing device model to compatible settings.

16. The non-transitory computer-usable data carrier of claim 15, wherein the one or more trigger events comprise: a printer instance is installed, upgraded, or changed; a printer properties graphical user interface (GUI) utility is opened; a port or IP address to which a printer instance is connected is changed; and/or a routine polling schedule.

17. The non-transitory computer-usable data carrier of claim 15, wherein a driver installation package for the universal print driver includes executable software common to multiple printing device models and hidden entries associating model-specific data files which define capabilities and constraints for every supported printing device model.

18. The non-transitory computer-usable data carrier of claim 17, wherein the driver installation package comprises one or more fallback modes that work with other printing devices that support the driver's page-description language.

19. The non-transitory computer-usable data carrier of claim 17, wherein the event log comprises a Windows® event log enabled as the "Microsoft-Windows-PrintService/Operational" event log.

20. The non-transitory computer-usable data carrier of claim 15, wherein when there is not a specific driver for the connected printing device model, detecting what printing device family the connected printing device is from and selecting a fallback driver for that family that can use one or more of a set of special features offered by that family.

* * * * *